United States Patent Office 3,736,323
Patented May 29, 1973

3,736,323
1-AMINOALKYL-2,6-DIARYL-4,5,6,7-
TETRAHYDROINDOLES
Michael Finizio, Howard Beach, and Karl Schoen, Kew Gardens, N.Y., assignors to Endo Laboratories Inc., Garden City, N.Y.
No Drawing. Original application Mar. 18, 1968, Ser. No. 714,067, now Patent No. 3,621,027. Divided and this application Feb. 3, 1971, Ser. No. 112,419
Int. Cl. C07d 29/28
U.S. Cl. 260—293.61         4 Claims

ABSTRACT OF THE DISCLOSURE

1 - aminoalkyl - 2,6 - diaryl - 4,5,6,7-tetrahydroindoles are useful as analgetics and anti-tussives.

RELATED APPLICATIONS

This is a division of application Ser. No. 714,067 filed Mar. 18, 1968, now U.S. Pat. No. 3,621,027 granted Nov. 16, 1971.

DESCRIPTION OF THE INVENTION

This invention relates to 1-aminoalkyl-2,6-diaryl-4,5,6, 7-tetrahydroindoles of the formula

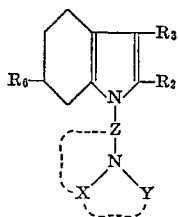

wherein $R_3$ is hydrogen, lower alkyl, phenyl or phenyl-lower alkyl,
$R_2$ and $R_6$ are phenyl, halophenyl or alkoxyphenyl,
Z is a straight or branched chain hydrocarbon moiety of 0-4 carbon atoms,
X and Y are hydrogen, lower alkyl, hydroxy-lower alkyl, phenyl-lower alkyl, or when taken together,

is piperidino, 1-pyrrolidinyl, or hexamethylenimino, and wherein the term "lower alkyl" refers to both straight and branched chain radicals of 1 to 6 carbon atoms, and
when taken together the group

is piperidyl or (lower alkyl)piperidyl wherein the term "lower alkyl" refers to bother straight and branched chain radicals of 1 to 6 carbon atoms,
and to the pharmaceutically acceptable salts thereof.

The manner and process of making and using this invention is described in the aforesaid Patent No. 3,621,027, granted Nov. 16, 1971, the disclosure of which is incorporated herein by reference.

We claim:
1. A compound of the formula

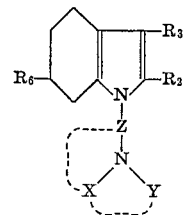

wherein $R_3$ is hydrogen, lower alkyl, phenyl or phenyl-lower alkyl,
$R_2$ and $R_6$ are phenyl, halophenyl or alkoxyphenyl,
Z is a straight or branched chain hydrocarbon moiety of 0-4 carbon atoms,
X and Y are hydrogen, lower alkyl, hydroxy-lower alkyl, phenyl-lower alkyl, or when taken together, X—N—Y is piperidino, 1-pyrrolidinyl, or hexamethylenimino, and wherein the term "lower alkyl" refers to both straight and branched chain radicals of 1 to 6 carbon atoms, and
when taken together the group

is piperidyl or (lower alkyl)piperidyl wherein the term "lower alkyl" refers to both straight and branched chain radicals of 1 to 6 carbon atoms,
and the pharmaceutically acceptable salts thereof.
2. The compound of claim 1, wherein said compound is 1 - (2 - dimethylaminoethyl) - 4,5,6,7-tetrahydro-2,6-diphenylindole.
3. The compound of claim 1, wherein said compound is 1 - (2 - dimethylaminoethyl) - 4,5,6,7 - tetrahydro-3-methyl-2,6-diphenylindole.
4. The compound of claim 1, wherein said compound is 4,5,6,7 - tetrahydro - 2,6 - diphenyl - 1 - (3-piperidyl) indole.

References Cited
UNITED STATES PATENTS

| | | | |
|---|---|---|---|
| 3,136,770 | 6/1964 | Gray | 260—293 |
| 3,491,093 | 1/1970 | Pachter et al. | 260—247.5 |
| 3,503,990 | 3/1970 | Schoen et al. | 260—326.12 |
| 3,621,027 | 11/1971 | Schoen et al. | 260—293.61 |

HENRY R. JILES, Primary Examiner
G. T. TODD, Assistant Examiner

U.S. Cl. X.R.
260—326.15